United States Patent [19]
Habiger

[11] 3,990,320
[45] Nov. 9, 1976

[54] CONTROL LINKAGE FOR HYDROSTATIC TRANSMISSIONS

[75] Inventor: Cyril William Habiger, Joliet, Ill.
[73] Assignee: Caterpillar Tractor Co., Peoria, Ill.
[22] Filed: Dec. 9, 1974
[21] Appl. No.: 530,924

[52] U.S. Cl. ............................. 74/473 R; 91/411 R
[51] Int. Cl.² ........................................ G05G 11/00
[58] Field of Search .................. 137/625.18, 625.19; 251/279; 91/411; 74/471, 473, 479, 480, 4

[56] References Cited
UNITED STATES PATENTS

| | | | |
|---|---|---|---|
| 2,646,474 | 7/1953 | Stratton | 74/483 |
| 2,867,131 | 1/1959 | Schroeder | 74/480 |
| 3,864,914 | 2/1975 | Timmins | 74/481 |

Primary Examiner—Samuel Scott
Assistant Examiner—Wesley S. Ratliff, Jr.
Attorney, Agent, or Firm—Phillips, Moore, Weissenberger, Lempio & Strabala

[57] ABSTRACT

A control linkage system for interconnecting the servo valves of a pair of variable displacement hydraulic machines includes means to permit separate inputs to control one servo valve relative to another interconnected therewith.

10 Claims, 4 Drawing Figures

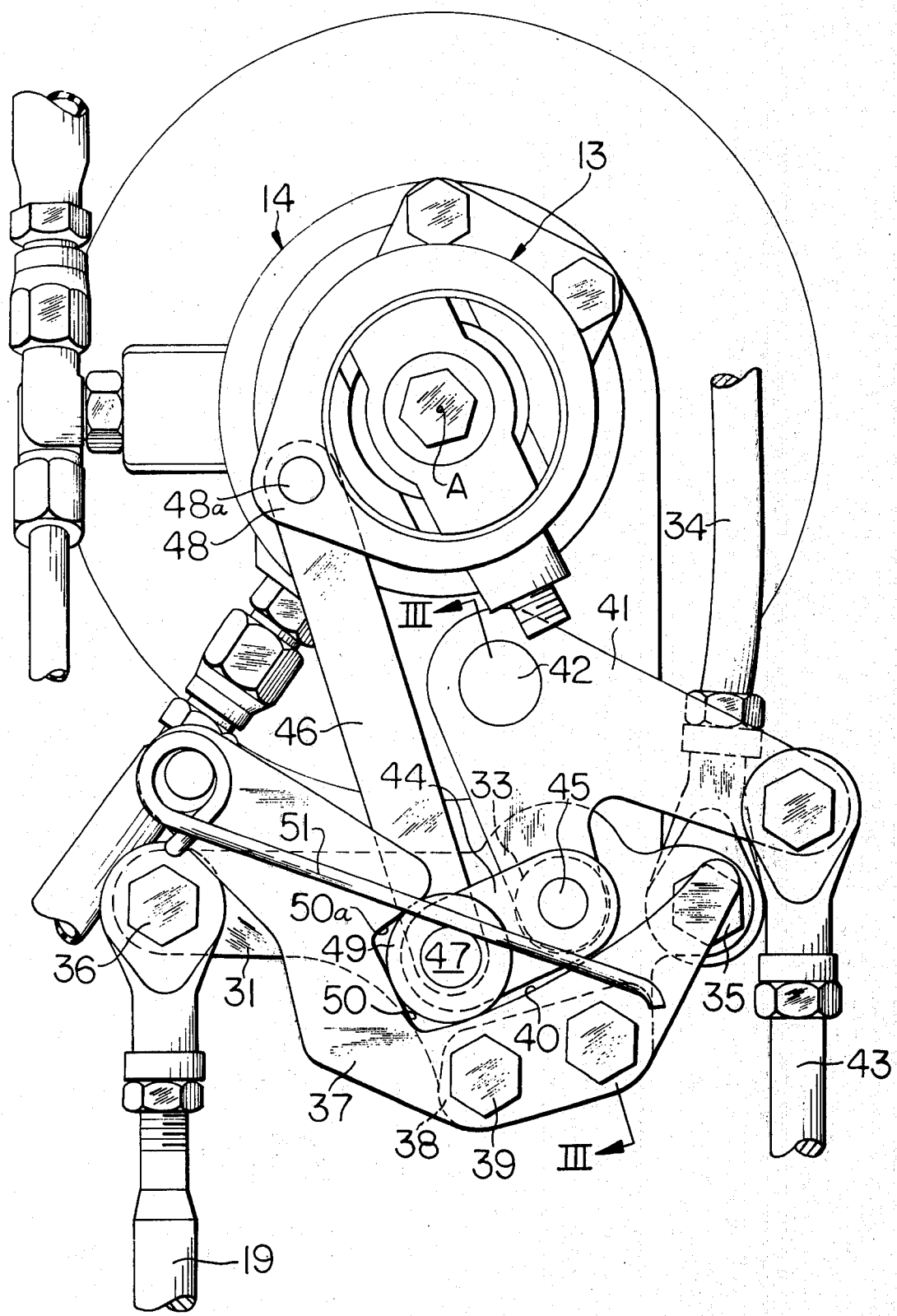

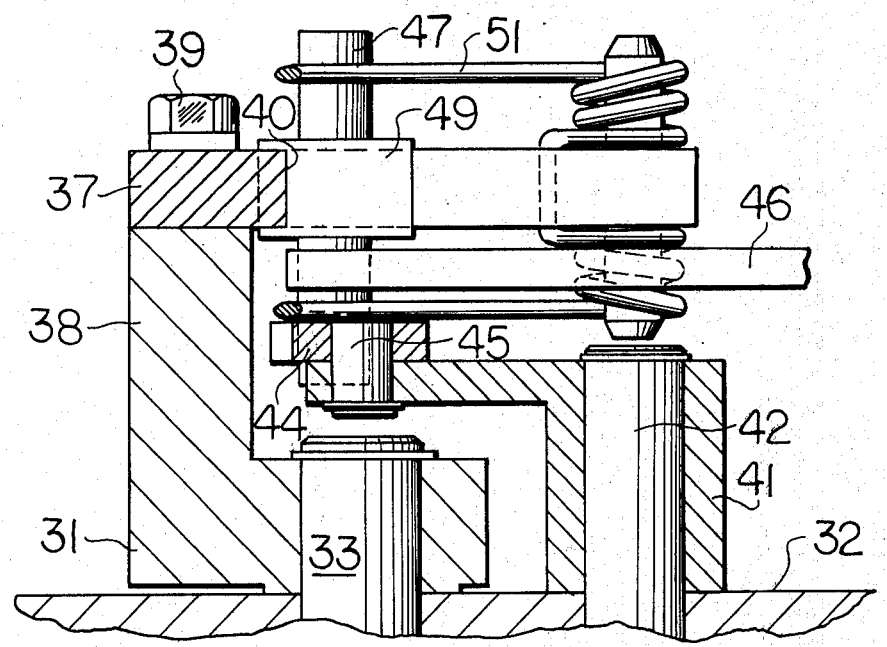
Fig_3_
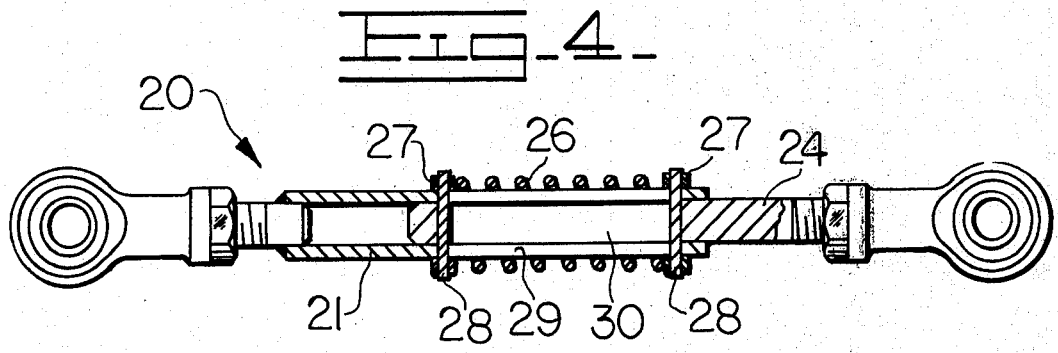
Fig_4_

CONTROL LINKAGE FOR HYDROSTATIC TRANSMISSIONS

BACKGROUND OF THE INVENTION

The present invention relates to control linkages and pertains particularly to linkage means to connect a pair of servo valves of a hydrostatic transmission for simultaneous operation or for individual operation.

Hydrostatic transmissions for track-type vehicles commonly employ a pair of variable displacement, over-center pumps individually hydraulically connected to a pair of drive motors drivingly connected to the tracks. The speed of the vehicle is controlled by selective positioning of the swash plate of the pumps for varying the output displacement while steering is accomplished by reducing the displacement of one pump to decrease the speed of the respective hydraulic motor with respect to the other motor. Thus, the control linkage for controlling pump displacement must be capable of simultaneous control of the swash plate of both pumps in both directions for forward and reverse travel and individual control over the swash plate of both pumps for steering. Furthermore, it is desirable for the control linkage to be returned to a neutral or zero displacement position when the speed input signal is reduced.

One problem with such systems having either one or two pumps, and two motors, is in providing a control system having provision for precise synchronism between the drive motors. The need for synchronism is especially critical when the steering control is in the neutral position for movement of the vehicle in a straight line. Without precise adjustments or position correspondence of the pump and/or motors, the vehicle will not travel in a straight line.

One approach to this problem is disclosed in U.S. Pat. No. 3,772,964 issued Nov. 20, 1973 and assigned to the assignee hereof.

SUMMARY AND OBJECTS OF THE INVENTION

It is the primary object of the present invention to provide a control linkage system for interconnecting a pair of separate variable displacement hydraulic machines for simultaneous control of the displacement thereof and to permit individual control of each.

Another object is to provide a control linkage system for interconnecting a pair of variable displacement hydraulic pumps for position correspondence.

A further object of the present invention is to provide a control linkage system for interconnecting the servo valves of a pair of variable displacement pumps for simultaneous coordinated variation in the displacement thereof and for separate variation of each.

In accordance with the present invention, a control linkage system interconnects the servo valves of a pair of variable displacement hydraulic pumps for simultaneous coordinated control of the displacement thereof and for separate and individual control of the adjustment thereof.

BRIEF DESCRIPTION OF THE DRAWINGS

These and other objects and advantages of the present invention will become apparent from the following description when read in conjunction with the accompanying drawings wherein:

FIG. 2 is a detailed view of a portion of the linkage of FIG. 1;

FIG. 3 is a sectional view taken generally along lines III—III of FIG. 2; and,

FIG. 4 is a view partially in section of a link of the system of FIG. 1.

DETAILED DESCRIPTION OF A PREFERRED EMBODIMENT

Figure 1:
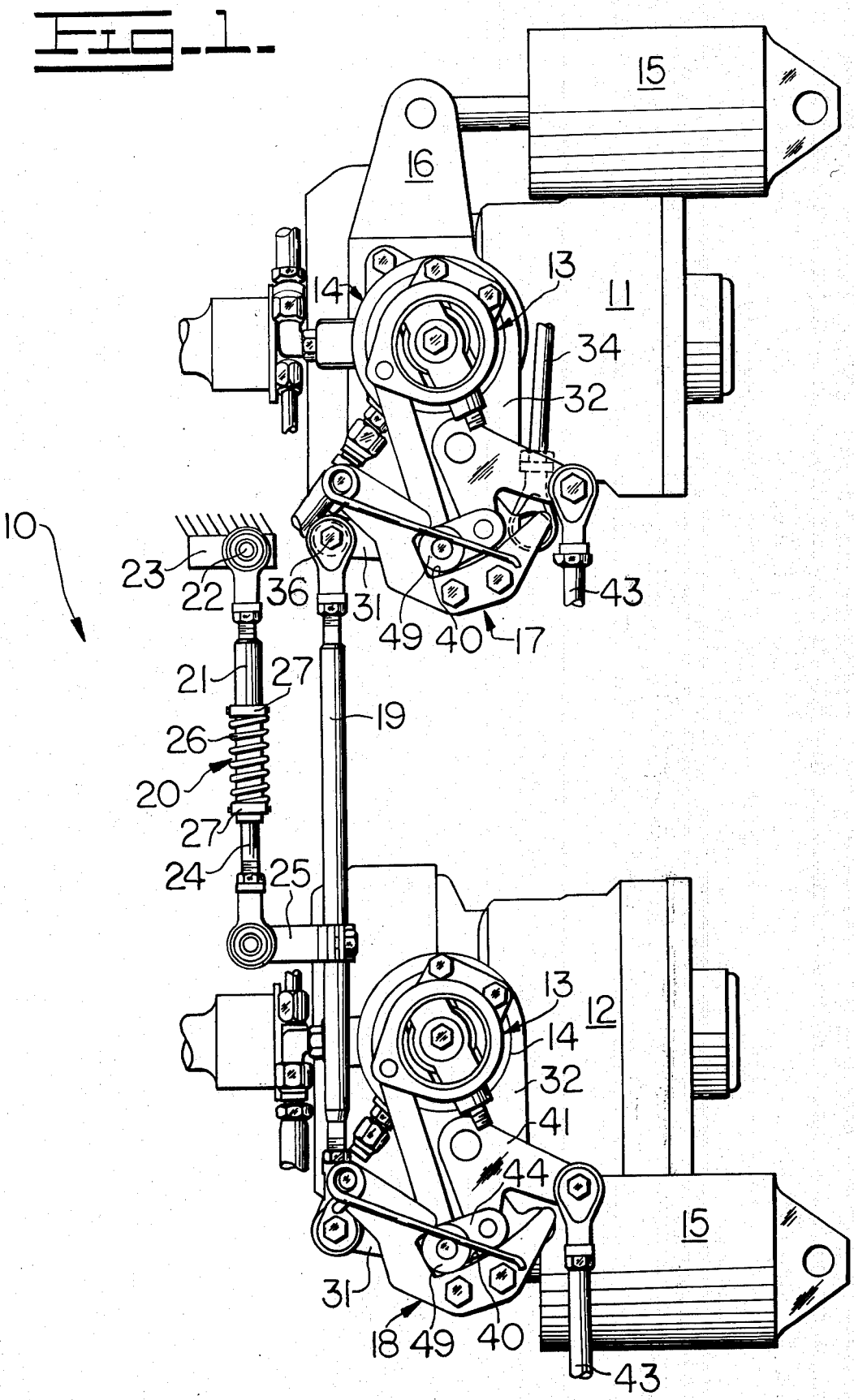
FIG. 1 is a schematic plan view of a linkage system embodying the present invention.

Referring now to the drawings, a control linkage mechanism is indicated generally by the reference numeral 10 shown interconnecting the controls of a pair of variable displacement, over-center hydraulic machines such as pumps 11 and 12. Each pump includes a swash plate control such as a null and gain adjuster mechanism indicated generally at 13 secured to a rotary servo valve 14 for imparting rotation to a valve spool thereof, not shown, about an axis A, FIG. 2. The null and gain adjuster is fully described in my copending application Ser. No. 530,926 filed Dec. 9, 1974 simultaneously herewith and entitled Null and Gain Adjustment Mechanism. Rotation of the rotary servo valve of each pump directs pressurized fluid to the appropriate end of a hydraulic cylinder 15 attached to a variable angle swash plate 16 which determines the displacement of the pump.

The control linkage mechanism includes a pair of actuating linkages 17 and 18 operatively connected to the controls of pumps 11 and 12 respectively, for controlling the rotational position of the respective null and gain adjuster of each pump. A tie rod 19 extends between the actuating linkages so that they may be operated in unison for a vehicle speed change and/or a change in the direction of travel as will hereinafter be described.

A resilient centering link 20 for centering the rod 19 in a neutral position corresponding to the zero displacement of the pumps includes an elongated tubular portion 21 pivotally attached at 22 to a case or housing member, a portion of which is shown at 23. One end of an elongated rod portion 24 is telescopically slidably mounted within the tubular portion 21 with its other end pivotally attached to a bracket 25 secured to the rod 19. A compression spring 26 is mounted on the tubular portion in a slightly compressed condition between a pair of annular collars 27. Each collar is slidably mounted on the tubular portion 21 and retained thereon by a pin 28 extending through the collar and elongated slots 29 and 30 formed in the tubular portion and rod portion, respectively. Thus, with the tubular portion attached to the housing 23, movement of rod 19 in either direction compresses the spring. The spring returns rod 19 to its neutral position in the absence of any external actuating forces on the control linkage mechanism. The rod 19, as illustrated, can be either extended or retracted in length to adjust the neutral position of the linkage.

As more clearly shown in FIGS. 2 and 3, each of the actuating linkages 17 and 18 includes a lever or bell-crank 31 pivotally mounted to a plate 32 of the pump by a vertically extending pin 33. A control rod 34 is pivotally attached at one end to one end of the lever 31 by a pin 35 and is operatively attached at the other to suitable operator input control, not shown, for speed and direction control of the pump output. The opposite end of the lever 31 is pivotally attached to the respective end of the tie rod 19 by a pin 36. A cam plate or member 37 is rigidly secured to the top of an upwardly projecting portion 38 of the lever 31 by a pair of bolts 39 and includes an arcuate cam surface 40 formed thereon generally facing the null and gain adjuster mechanism.

A bellcrank 41 is pivotally mounted on a pin 42 extending upwardly from the plate 32 and is pivotally connected at one end to a steering input link 43. A guide link 44 is pivotally connected by pin 45 to the other arm of the bellcrank 41 and is pivotally connected at its other end to a transfer link 46 by a pin 47. The opposite end of the transfer link 46 is connected to the null and gain adjuster at a pivot 48a of lever 48 connected to the servo valve. A roller 49 defining a cam follower is rotatably mounted on the pin 47 and is biased against the cam surface 40 and in abutment with a stop surface 50 by a torsion spring 51. An abutting shoulder 50a provides hook-like means for a positive connection of link 46 to cam plate 37 which is connected to lever 31 in the position as shown.

With the actuating linkage in the neutral position shown, the center point from which the arcuate cam surface 40 is generated (i.e. its radius) coincides with the center of the pivot 48a. Also, the pivot 45 is axially aligned with the pivot 33 of the lever 31 and cam 40. Thus, if the bellcrank 41 is rotated, the roller 49 is translated along the cam surface and does not impart any rotational movement to the null and gain actuator lever 48.

When the control rod 34 is moved in a downward direction as viewed in FIGS. 1 and 2, due to a mechanical input thereto, the levers 31 and cams 40 of both actuating linkages 17 and 18 are rotated clockwise in unison about their respective pins 33. This sets cam 40 at an angle with respect to pivot point 48a of link 46. Thus, with the rollers 49 abutting the cam surface 40, a linear motion is imparted to the links 46 to rotate the servo valves of the respective null and gain adjusters 14 clockwise about pivot A proportionately to the amount of rotation of the levers 31. This results in a tilting of the swash plate and an output of fluid from the pump to drive the vehicle in a first direction. Conversely, counterclockwise rotation of the levers 31 imparts a proportional amount of counterclockwise rotation of the null and gain adjusters for swiveling the swash plate in the opposite direction for driving the vehicle in the opposite direction.

Steering of the vehicle is accomplished with the vehicle moving and the levers 31 in a displaced or actuating position away from the neutral position shown. The rotated position of the levers changes the position of the axis of the arcuate cam surface relative to the pivot 48a of link 46 such that counterclockwise rotation of the bellcrank 41 translates the roller 49 along the cam surface 40, causing the link 46 to rotate the null and gain adjuster towards the zero displacement position reducing the output of the respective pump. The bellcranks 41 of the actuating linkages 17 and 18 are individually controlled and a steering input to the bellcrank of one actuating linkage has no effect on the bellcrank of the other actuating linkage. Thus, the output of one pump is reduced while the output of the other pump remains substantially constant, thereby initiating a turning maneuver of the vehicle.

While the invention has been illustrated and described by means of a single embodiment, it is to be understood that numerous changes and modifications may be made in the illustrated embodiment without departing from the spirit and scope of the invention as defined in the appended claims.

What is claimed is:

1. A control linkage system for connecting a pair of input control functions to the servovalve of a variable displacement hydraulic machine, comprising:
   a servovalve mounted for rotation about a first axis for controlling the displacement of a hydraulic machine;
   a first lever operatively connected to said servovalve and pivotal therewith about said first axis for controlling said servovalve;
   a second lever pivotally mounted to one side of said first lever including cam means carried thereby;
   a first link operatively connecting said first lever to said second lever and said cam means;
   a first input control link connected to one end of said second lever;
   a bellcrank pivotally mounted adjacent said second lever, and between said cam means and said first axis;
   means connecting one end of said bellcrank to one end of said first link for movement of said one end of said link along said camming means;
   a second input control link connected to the other end of said bellcrank;
   said cam means includes an open face arcuate camming surface open toward said first axis having a radius equal to the effective length of said first link in relation to said cam, and said cam being movable with said second lever to a position wherein said camming surface has an axis which coincides with the pivotal connection of said first link with said first lever to define a neutral position of said cam and movable away from said position to define an actuating position, said first link includes a cam follower on said one end thereof engaging said camming surface; and,
   spring means biasing said cam follower into engagement with and to one end of said camming surface for operative connection thereto.

2. The control system of claim 1 wherein:
   said spring means comprises a torsion spring mounted on said second lever and including an elongated arm engaging a pin on which said cam follower is mounted for biasing said follower into engagement with said cam surface.

3. The control linkage system of claim 2 in combination with a second servo valve and control system including a tie rod interconnecting the other end of the second lever of said systems; and centering means connected to said tie rod for centering said systems to a neutral position.

4. The control linkage system of claim 2 wherein said second lever includes a face at one end of said cam face opposing said cam face for engagement with said cam follower for positive connection of said first link to said second lever only when said follower is positioned at said one end of said cam face; and,
   said spring normally biases said follower to said one end of said cam face.

5. The control linkage system of claim 1 in combination with a second servo valve and a second control linkage as defined in claim 1; and,
   a tie rod connected to the other end of the second control lever of each of said control linkage systems.

6. A control linkage system for connecting a pair of input control functions to the servovalve of a variable displacement hydraulic machine, comprising:
- a servovalve mounted for rotation about a first axis for controlling the displacement of a hydraulic machine;
- a first lever operatively connected to said servovalve and pivotal therewith about said first axis for controlling said servovalve;
- a second lever pivotally mounted to one side of said first lever including cam means carried thereby;
- a first link operatively connecting said first lever to said second lever and said cam means;
- a first input control link connected to one end of said second lever;
- a bellcrank pivotally mounted adjacent said second lever, and between said cam means and said first axis;
- means connecting one end of said bellcrank to one end of said first link for movement of said one end of said link along said camming means; and,
- a second input control link connected to the other end of said bellcrank, all in combination with a second servovalve and a second control linkage as defined and, a tie rod connected to the other end of the second control lever of each of said control linkage systems; and,
- a centering link connected to said tie rod for normally biasing said control linkage systems to a neutral position.

7. A control linkage system for connecting a servovalve for actuation by a pair of input controls comprising:
- a servovalve mounted for rotary motion about an axis for controlling the displacement of a hydraulic machine;
- a first lever arm connected to said servovalve for pivotal movement therewith about said axis;
- a lever mounted adjacent said lever arm;
- a bellcrank mounted between said lever arm and said first lever;
- a first link operatively connecting said lever arm to said lever, and a second link connecting one end of said first link to said bellcrank;
- a first input control link connected to one arm of said lever for transmitting a first control function to said servovalve;
- a second input control link connected to one arm of said bellcrank for transmitting a second control function to said servo control valve;
- variable open faced cam means mounted on said lever and movable thereby from a neutral position to a camming position;
- a cam follower mounted on one end of said first link and engaging said cam means; and,
- spring means mounted on said lever and operative for biasing said follower into engagement with said cam means.

8. The control linkage system of claim 7 wherein said cam means includes an arcuate camming surface having a radius equal to the length of said first link and an axis that coincides with the connection of said link to said lever arm when said cam is in its neutral position.

9. The control linkage system of claim 8 in combination with a second identical system and including a tie rod interconnecting said systems for simultaneous movement when said lever is moved.

10. The control linkage system of claim 8 wherein said second lever includes a face at one end of said cam means opposing said cam means for engagement with said cam follower for positive connection of said first link to said second lever only when said follower is positioned at said one end of said cam means; and,
said spring normally biases said follower to said one end of said cam means.

* * * * *